(12) United States Patent
Cowelchuk et al.

(10) Patent No.: US 7,234,724 B1
(45) Date of Patent: Jun. 26, 2007

(54) AIRBAG ASSEMBLY WITH ANGLED KEYWAY

(75) Inventors: Glenn A. Cowelchuk, Chesterfield Township, MI (US); Sarkis B. Mikhjian, Rochester Hills, MI (US); Paul W. Nagy, Macomb, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 0 days.

(21) Appl. No.: 11/535,121

(22) Filed: Sep. 26, 2006

(51) Int. Cl.
*B60R 21/16* (2006.01)
(52) U.S. Cl. .................................................. 280/728.2
(58) Field of Classification Search ............. 280/728.3, 280/728.2, 732
See application file for complete search history.

(56) References Cited

U.S. PATENT DOCUMENTS

| | | | |
|---|---|---|---|
| 5,769,451 A | 6/1998 | Inada et al. | |
| 6,109,645 A | 8/2000 | Totani et al. | |
| 6,161,865 A * | 12/2000 | Rose et al. | 280/728.3 |
| 6,250,669 B1 * | 6/2001 | Ohmiya | 280/732 |
| 6,394,485 B1 * | 5/2002 | Amamori | 280/728.2 |
| 6,406,056 B2 | 6/2002 | Yokota | |
| 6,435,542 B2 * | 8/2002 | Nakashima et al. | 280/728.3 |
| 6,595,543 B2 | 7/2003 | Desprez | |
| 6,719,320 B2 | 4/2004 | Gray et al. | |
| 6,761,375 B2 | 7/2004 | Kurachi et al. | |
| 6,860,505 B2 * | 3/2005 | Yasuda et al. | 280/728.3 |
| 6,929,280 B2 | 8/2005 | Yasuda et al. | |
| 7,007,970 B2 * | 3/2006 | Yasuda et al. | 280/728.3 |
| 7,073,817 B2 * | 7/2006 | Rogers et al. | 280/728.2 |
| 7,093,847 B2 * | 8/2006 | Hurst | 280/728.2 |
| 2002/0005630 A1 * | 1/2002 | Suzuki et al. | 280/728.3 |

\* cited by examiner

*Primary Examiner*—Eric Culbreth
*Assistant Examiner*—Karen J. Amores
(74) *Attorney, Agent, or Firm*—Brooks Kushman P.C.

(57) ABSTRACT

In at least one embodiment, the present invention relates an airbag assembly comprising a panel having a tear seam forming at least one airbag door, and a door chute assembly comprising a laterally extending flange connected to the panel proximate the airbag door. The door chute assembly includes a chute depending from the flange away from the panel and the chute has at least one opening comprising a window portion communicating with an angled channel portion. The airbag assembly further comprises a door panel assembly including at least one door panel disposed within the chute and connected to the airbag door. The door panel has a downwardly depending flange having at least one projection extending laterally through the at least one opening of the chute. The airbag assembly further comprises an inflatable airbag mounted on the door chute.

20 Claims, 4 Drawing Sheets

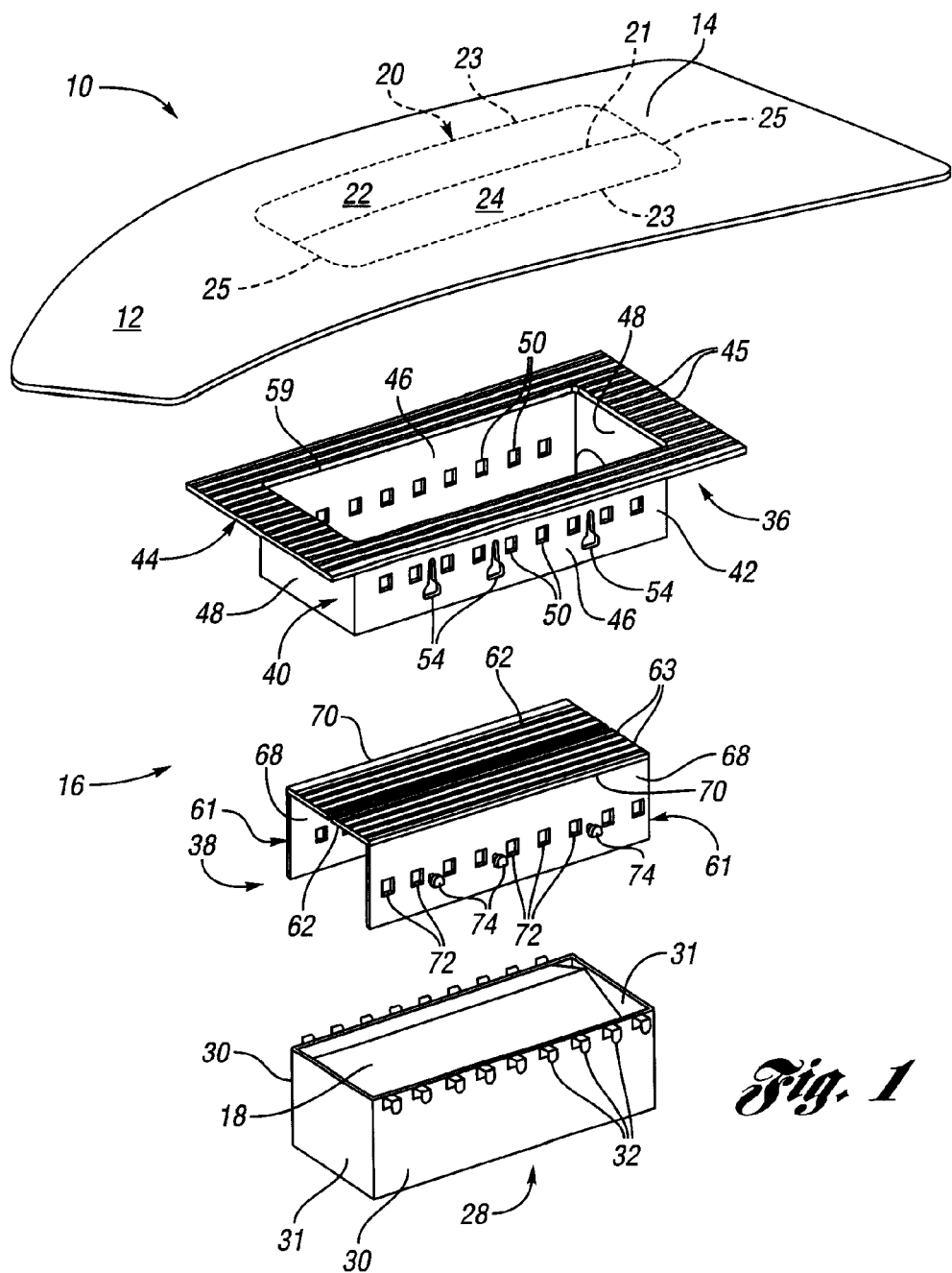
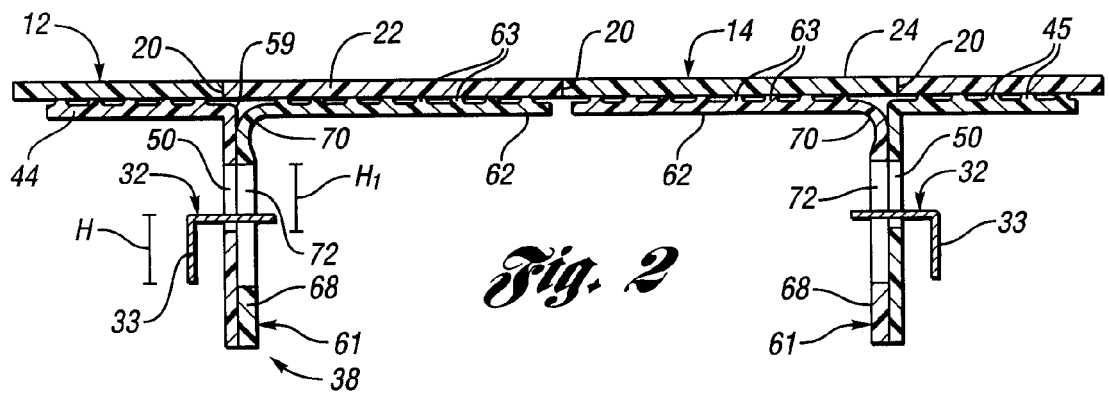
Fig. 1
Fig. 2

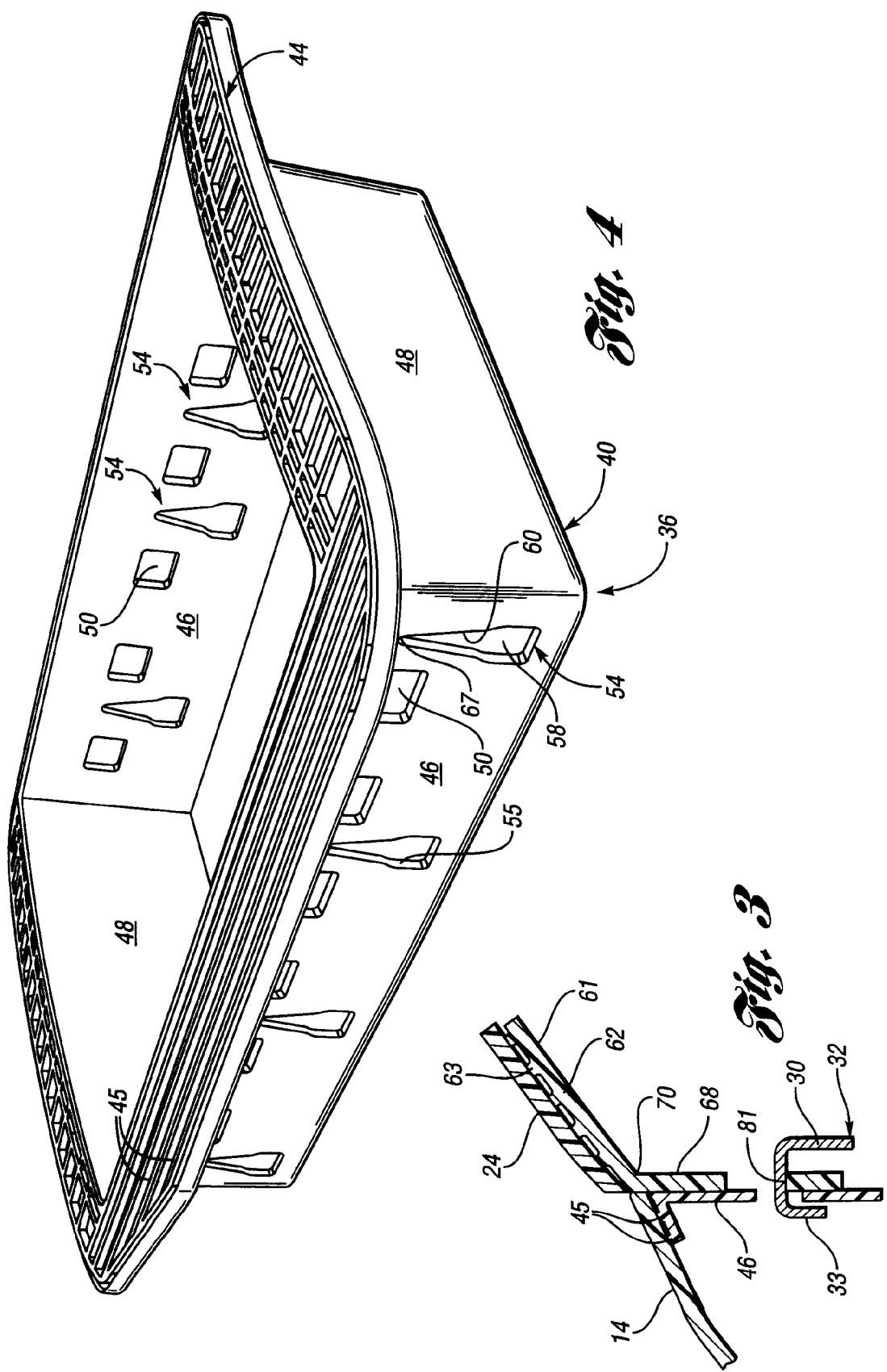

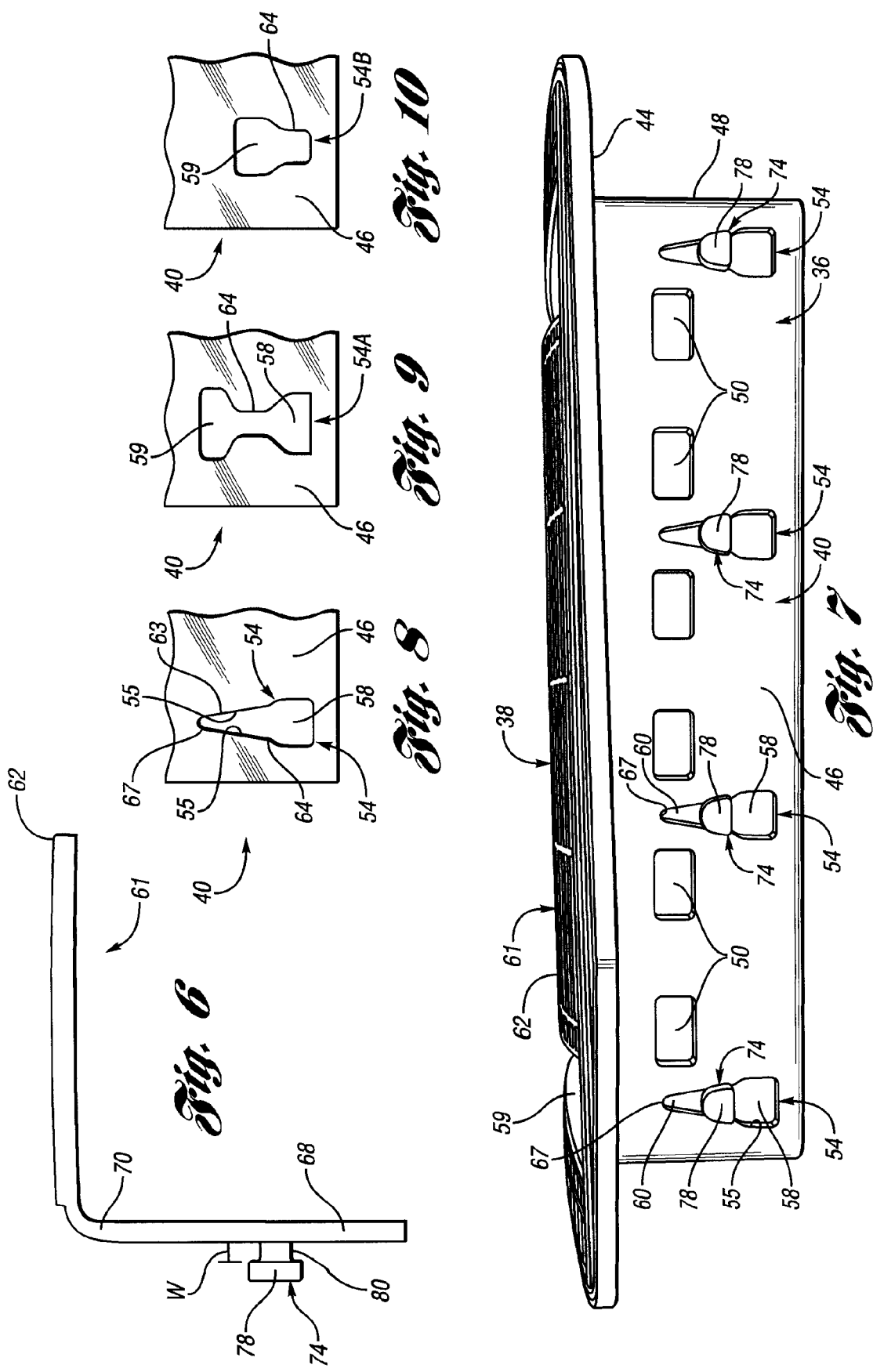

AIRBAG ASSEMBLY WITH ANGLED KEYWAY

BACKGROUND OF THE INVENTION

1. Field of the Invention

The present invention relates to an airbag assembly, and in particular to a door chute and panel assembly for use with an airbag assembly.

2. Background Art

Airbags are commonly used in motor vehicles, but may also be used in other types of modes of transportation such as trains and airplanes. Specifically, an airbag is stored in a folded condition in a stored receptacle and then rapidly inflates via an inflation fluid, as such with gas from a gas generator or other types of inflators, when an event indicative of a collision of the vehicle is detected by sensors. The airbag then deploys into a position to absorb the impact of the driver or passenger.

Prior airbag assemblies and manufacturing methods are disclosed in U.S. Pat. Nos. 5,769,451; 6,109,645; 6,406,056; and 6,929,280.

SUMMARY OF THE INVENTION

Under the invention, an airbag assembly is provided. In at least one embodiment, the airbag assembly comprises a panel having a tear seam forming at least one airbag door, and a door chute assembly comprising a laterally extending flange connected to the panel proximate the airbag door. The door chute assembly includes a chute depending from the flange away from the panel and having at least one opening comprising a window portion communicating with an angled channel portion. The airbag assembly further comprises a door panel assembly including at least one door panel disposed within the chute and connected to the airbag door. The door panel has a downwardly depending flange having at least one projection extending laterally through the at least one opening of the chute. The airbag assembly further comprises an inflatable airbag mounted on the door chute.

Under the invention, a door chute and panel assembly is also provided. In at least one embodiment, the door chute and panel assembly comprises a door chute assembly comprising a laterally extending flange connectable to a panel proximate an airbag door. The door chute assembly further includes a chute depending from the flange and having at least one opening comprising a window portion communicating with an angled channel portion. The door chute and panel assembly further include a door panel assembly including at least one door panel disposed within the chute and connectable to the airbag door. The door panel has a downwardly depending flange having at least one projection extending laterally through the at least one opening of the chute.

Under the invention, a method for manufacturing an airbag assembly is also provided. In at least one embodiment, the method for manufacturing an airbag assembly comprises providing a panel having a tear seam forming at least one airbag door, providing a door chute assembly comprising a chute having a laterally extending flange, with the chute having a window portion communicating with an angled channel portion, and connecting the flange of the door chute assembly to the panel proximate the airbag door. The method further comprises disposing a door panel assembly including at least one door panel within the chute and connecting the door panel to the airbag door. The door panel has a downwardly depending flange having at least one projection extending laterally through the at least one opening of the chute.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is an exploded view of an airbag assembly in accordance with at least one embodiment of the present invention;

FIG. 2 is a side view of components of the airbag assembly illustrated in FIG. 1;

FIG. 3 is a view of a portion of the airbag assembly illustrated in FIG. 2 showing parts in a different position;

FIG. 4 is a side view of a component of the airbag assembly illustrated in FIGS. 1-3;

FIG. 6 is a side view of the component illustrated in FIG. 5;

FIG. 7 is a side view of the components of the airbag assembly illustrated in FIGS. 1-3;

FIG. 8 is a view of a portion of the component illustrated in FIG. 4;

FIG. 9 is a view similar to FIG. 8 illustrating another embodiment of the present invention; and FIG. 10 is a view similar to FIG. 8 illustrating yet another embodiment of the present invention.

DETAILED DESCRIPTION OF THE PREFERRED EMBODIMENTS

Figure 5:
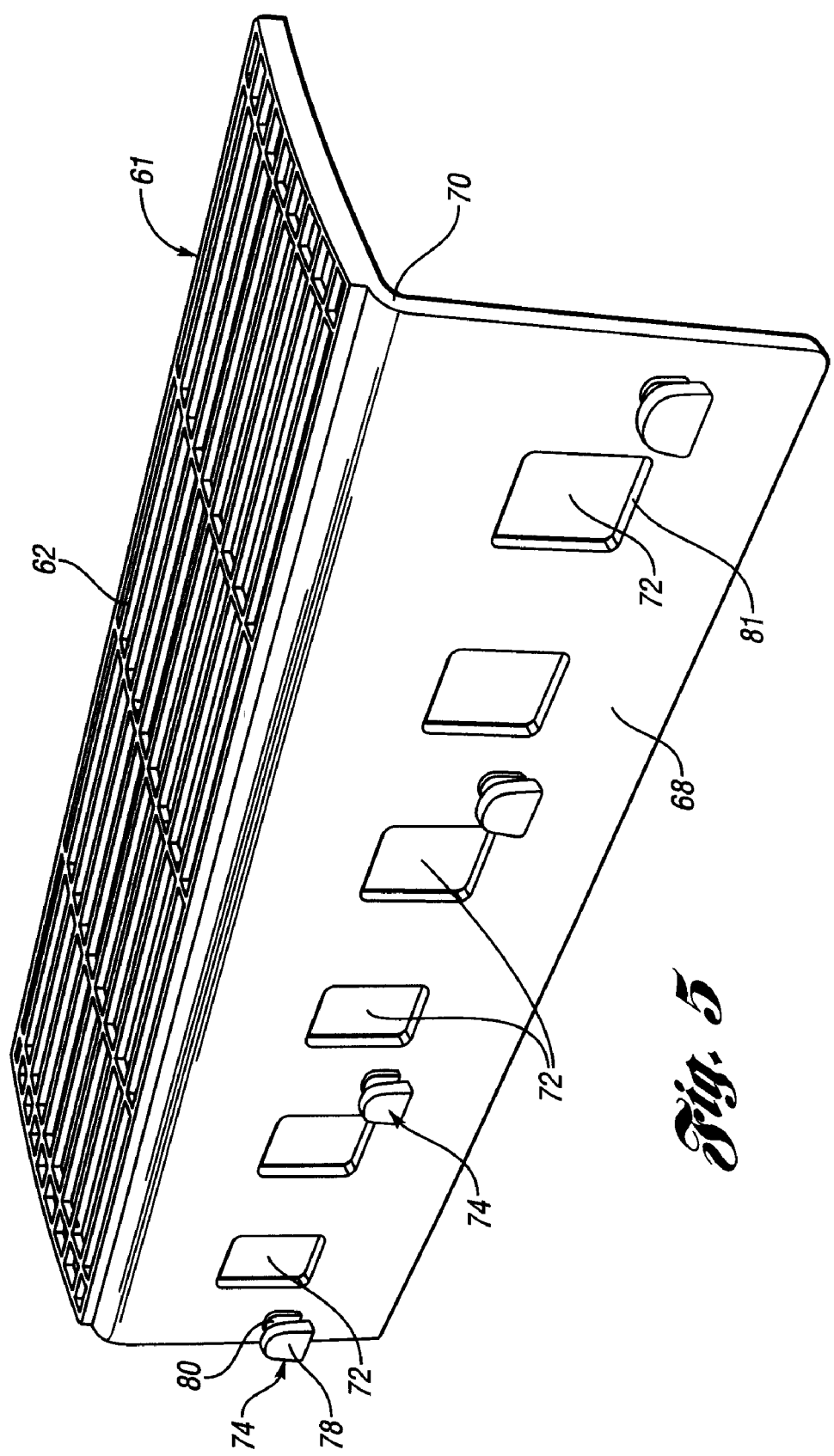
FIG. 5 is a perspective view of a component of the airbag assembly illustrated in FIGS. 1-3.

As required, detailed embodiments of the present invention are disclosed herein. However, it is to be understood that the disclosed embodiments are merely exemplary of the invention that may be embodied in various alternative forms. The Figures are not necessarily to scale, some features may be exaggerated or minimized to show details of particular components. Therefore specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in this description and in the claims indicating amounts of materials or conditions of reaction and/or the use are to be understood as modified by the word "about" in describing the broader scope of this invention. Practice within the numerical limits stated is generally preferred. Also, unless expressly stated to the contrary, the description of a group or class of materials as suitably preferred for a given purpose in connection with the invention implies that mixtures of any two or more members of the group or class may be equally suitable or preferred.

FIG. 1 shows an exploded view of the airbag assembly 10 in accordance with at least one embodiment of the present invention. Referring to FIGS. 1 and 2, the airbag assembly 10 includes an instrument panel 12 that is typically located in front of a windshield (not shown). A portion of the instrument panel 12, illustrated in this embodiment on the passenger side, forms a cover 14 that normally covers and hides an airbag system 16. As should be readily understood, the airbag system 16 can be any type of conventional airbag system having an inflatable airbag 18 for protecting a passenger seated in the passenger compartment. As with other conventional airbag systems 16, the airbag 18 can be inflated by an inflator (not shown) in response to a signal from a controller (now shown) indicating an alert indicative of a collision from a sensing device (not shown), as is well known in the art.

While the passenger compartment is illustrated as being in the front passenger space of the vehicle, it should be understood that the passenger compartment could also be differently located, such as at the driver side or rear passenger space. For instance, the airbag system 16 could alternatively or additionally be a rear and/or side impact airbag system. Moreover, the airbag system 16 could be a driver side system.

The cover 14 illustrated in the Figures comprises a single layer of plastic, such as thermosplastic olefin (TPO). It should be understood however that other types of plastic, such as thermoplastic elastomer (TPE), thermosplastic urethane (TPU), polycarbonate (PC), polypropylene (PP), SMA, acrylonitrile-butadiene-styrene (ABS), and PC/ABS, could also be used. Furthermore, while the cover 14, and thus the instrument panel 12, is illustrated in the Figures as a single layer of plastic, it should be understood that the cover and instrument panel could, in addition to the layer of plastic, include other layers as are known in the art, such as a layer of foam.

Referring to FIG. 1, the cover 14 include a tear seam 20 that, at least in the illustrated embodiment, operates to divide the cover into two door halves 22 and 24. The illustrated tear seam 20 comprises a center seam 21, two opposed hinge seams 23, and side seams 25 extending between and connecting the center seam and the hinge seams. While the tear seam 20 is illustrated in FIG. 1 to have a generally H shape, it should be understood that other configurations of patterns as is known in the art may alternatively be used. Examples of suitable alternative types of patterns include, but are not necessarily limited to, C-, U-, or X-shapes.

The airbag system 16 illustrated in FIG. 1 includes a reaction cannister 28 which houses the airbag 18 (in an undeployed state). The reaction cannister 28 also houses the inflator (not shown) which provide inflation fluid for inflating the airbag 18, when necessary. The reaction cannister 28 illustrated in FIG. 1 is generally rectangular and includes opposed sidewalls 30 with each sidewall having a plurality of hooks 32 extending therefrom. The hooks 32 include a downwardly depending portion 33 having a height H. The reaction cannister 28 illustrated in FIG. 1, further includes end walls 31 extending between and connecting the sidewalls 30.

The airbag assembly 16 further include a door chute assembly 36 and a cooperating door panels assembly 38. The door chute 36 and the door panels assembly 38 can both be made of the same or different suitable plastic materials. Examples of suitable plastic materials include, but are not necessarily limited to, thermoplastic elastomer (TPE), thermoplastic polyurethane (TPU), thermoplastic olethin (TPO), polyvinyl chloride (PVC), and polyofefins, such as PP.

The chute assembly 36 and the door panels assembly 38 are secured to the cover 14 in any suitable manner. For instance, the chute assembly 36 and the door panels assembly 38 can be secured to the cover 14 by vibration welding, bolts, screws, rivets, adhesive and sonic welding. The chute assembly 36 helps to guide deployment of the airbag 18 and reinforce the tear seam 20. The chute assembly 36 also helps inhibit the linear movement of panels 61. The door panel assembly 38 helps to open door halves 22 and 24, keeps the door panels 61 attached to the chute assembly 30 during deployment, and reinforce the tear seam 20.

The chute assembly 36 in the illustrated embodiment include a generally rectangular chute 40 defined by two opposed sidewalls 46 connected by two opposed end walls 48. In at least the illustrated embodiment, each of the sidewalls 46 includes spaced apart windows 50. While the windows 50 can have any suitable shape, they are shown in the illustrated embodiments to have generally rectangular shape. In at least one embodiment, the windows 50 are sized to allow hooks 32 to float therein and have a height $H_1$ that is at least as big as, and in other embodiments, greater than the height H of the depending portion 33 of hooks 32. Each of the sidewalls 46 also include spaced apart slots 54, each defined by a respective slot surface 55. It should be understood that the number and location of the windows 50 and the slots 54 can vary as desired.

In at least the embodiment illustrated in the Figures, as best seen in FIGS. 7 and 8, the slots 54 each include a shaped window opening 58 towards the bottom of the sidewall 46 and a relatively thin angled channel 60 extending from the shaped window opening towards the top 59 of the end wall 48. As can best be seen in FIG. 5, the channel 60 terminates in an end point 67. While the shape of the window opening 58 is illustrated to be an arched shape, it should be understood that the shape of the window opening can be any suitable shape, such as rectangular, square and oval, provided the window opening 58 is big enough to enable the projection 74 to fit within.

The angled channel 60 includes a base portion 64 and an angled extension portion 63. The base portion 64 is adjacent the window opening 58 and the extension portion 63 extends between the base portion 58 and the end point 67. As the extension portion 63 extends towards the end point 67 the distance between the opposed surfaces of the slot surface 55 decreases. This operates to inhibit the movement of the panels 61 as will be explained further below. In at least one embodiment, the angled extension portion is 10 to 40 mm, and in another embodiment 15 to 25 mm. In at least one embodiment, each side of the angled channel extends inwardly at an angle of 1 to 20°, in another embodiment, 2 to 15°, and in yet another embodiment 3 to 10'. This allows the center seam 21 to break open before the hinge seams 23. In another embodiment, the side seams 25 also open before the hinge seams 23.

As can best be seen in the embodiment illustrated in FIG. 1, the chute assembly 36 includes a flange 44 extending laterally from the top 59 of the chute 40. In at least the illustrated embodiment, the flange 44 extends away from the chute 40 on all four sides of the chute, however, it should be understood that the flange 44 could extend from less than four sides of the chute. For instance, the flange 44 could extend only away from the top 59 of the sidewalls 46. As can best be seen in FIGS. 1 and 2, in at least the illustrated embodiment, the flange 44 includes laterally extending ribs 45 to help facilitate attachment of the chute assembly 36 to the instrument panel 12. For instance, if the chute 40 is to be vibration welded to the cover 14, the ribs 45 effectively reduce the amount of material required to be welded.

Referring to FIGS. 1 and 2, the door panels assembly 38 include opposed door panels 61 that fit within the chute assembly 36. Each door panel 61 includes a door portion 62. The door portion 62 as can be best seen in the Figures generally extends laterally underneath the cover 14. As can best be seen in FIGS. 1, 2 and 7, each door portion 62 includes laterally extending ribs 63 to help facilitate attachment of the door panels 61 to the cover 14. Each door panel 61 further includes a downwardly depending flange 68. Each door panel 61 includes a hinge 70 extending between and connecting the door portion 62 and the downwardly depending flange 68.

As can best be seen by FIGS. 2 and 5, each downwardly depending flange 68 includes spaced apart flange window openings 72 and spaced apart projection 74 extending from the downwardly depending flange 68. It should be understood that the number and location of the window openings 72 and the projections 74 can vary as desired. While the windows openings 72 can have any suitable shape, they are shown in the illustrated embodiments to have generally rectangular shape. While the windows 72 can have any suitable size, in at least one embodiment, they should have a height that is sufficient (i.e., long enough) to enable the hinge 70 of the door panels 62 to extend above the "A" surface of the instrument panel 12 upon deployment.

Each of the projections 74 include a shaped base 78 and an arm 80 that extends between and connect the base 78 with the downwardly depending flange 68. As can be seen in the Figures, the base 78, while generally the same shape as the window opening 58, is smaller in size then the window opening 58 such that the base 78 can be slid through the window opening 58 so the arm 80 can be received within the slot 54. It should be understood however that while being illustrated as being the same general shape as the shape of the window 58, the shape of the base 78 could differ from the shape of the window 58 so long as the base 78 is insertable receivable within the window 58 in a T-slot type of manner. The arm 80 is generally the same thickness as the base 64 of the slot channel 60, such that the arm 80 can be received within the slot and maintain therewith. The arm 80 is generally thicker than the angled extension portion 63 such that the angled extension portion inhibits linear movement of the panels 61 during airbag deployment. In at least the embodiment illustrated in FIG. 1, the angled extension portion 63 is configured such that the center seam 21 opens before the hinge seams 23 do. Moreover, due to the slowed movement of the arm 80 within the angled extension portion 63, the arms 80 and/or bases 78 tend to remain attached to the flange 68 during and after deployment. The arm 80, in at least one embodiment, is the same width W as the thickness of the sidewall 46 of the chute 40.

The hooks 32 from the reaction cannister 28 go through the windows 72 and 50 in the door panels 61 and chute assembly 36, respectively. Upon deployment of the airbag 18, as shown schematically in FIG. 3, the deploying airbag 18 (not shown in FIG. 3) causes movement of the door panels 61 relative to the door chute assembly 36 and the portions of the instrument panel 12 adjacent the cover 14. The deployment of the airbag 18 causes the door panels 61 to move upwardly until the bottom edges 81 of the windows 72 contact the hooks 32 of the airbag cannister 28. Essentially, the hooks 32 restrain the upper movement of the panels 61 caused by inflation of the airbag 18 as the bottom surfaces of the windows 72 engage the hooks 32. At this point, the hinges 70 of the door panels 61 are above the portion of the instrument panel 12 adjacent the cover 14 such that the door portions 62 of the door panel 61 are above the show surface (i.e., the outer or "A" surface) of the instrument panel 12 before the airbag doors 22 and 24, respectively, and the door portions 62 of the panels 61 pivot to provide an opening for the airbag 18 to extend there through.

While deployment of the airbag 18 is taking place, the projections 74 slide up within the channels 60 of the slots 54. The projections 74 engage the side surfaces 55 of a respective angled extension portion 63 to inhibit the upward movement of the panels 61. In at least the illustrated embodiment, this allows the center seam 21 to break open before the hinge seams 23. In another embodiment, the side seams 25 also open before the hinge seams 23. The projection 74 also add a secondary retention system for the door panels 61 as the projection engage the top 67 of the slot 54. Moreover, the projections 74 and the slots 54 also cooperate to hold the door panel 61 to the chute assembly 36 as an assembly aid for securing the chute assembly 36 and door panels 61 to the instrument panel 12. The projections 74 also cooperate with the slots 54 to increase the hooks 32 ability to remain engaged to the chute assembly 36 and door panels assembly 38 during deployment.

Referring to FIG. 9, an alternative embodiment of the present invention is illustrated. In this embodiment, the slot 54 has a hourglass shape. The hourglass-shaped slot 54 has a window opening 58, similar to the window opening illustrated in FIG. 8, and a base portion 64 similar to the base portion 64 in FIG. 8. The hourglass shape slot 54a has a second shaped window portion 59 disposed above the base portion. In the illustrated embodiment, the second shaped window portion 59 is shaped the same as shaped window portion 58. The arm 80 can be received within the base portion 64 to inhibit movement of the door panel 61. After passing through base portion 64, the arm and shaped window portion 78 can be released from the chute 40 via the second shaped window portion 59. Base portion 64 receiving the arm 80 in an interference fit can help maintain the relative position of the door panel assemblies 38 and the chute assembly 36 during assembly of such to the instrument panel 12.

FIG. 10 is similar to FIG. 9 in that it shows and alternative embodiment of designated as generally slot 54b. Slot 54b has a base portion 64 which receives arm 80 to keep the assembly 36 and 38 together during attachment to instrument panel 12. The slot 54b also includes a second shape window 59 disposed above base 64. During assembly, base portion 78 can be inserted through second shaped window 59 and arm 80 can be slid down to be received within base portion 64 in an interference fit. After deployment, shaped base 78 and arms 80 can be disengaged from the chute 40 via the second shaped window 59.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:
1. An airbag assembly comprising;
   a panel having a tear seam forming at least one airbag door;
   a door chute assembly comprising a laterally extending flange connected to the panel proximate the airbag door, the door chute assembly including a chute depending from the flange away from the panel, the chute having at least one opening comprising a window portion communicating with an angled channel portion;
   a door panel assembly including at least one door panel disposed within the chute and connected to the airbag door, the door panel having a downwardly depending flange having at least one projection extending laterally through the at least one opening of the chute; and
   an airbag assembly comprising an inflatable airbag mounted on the door chute.

2. The airbag assembly of claim 1 wherein the angled portion decreases in width as it extends from the window portion.

3. The airbag assembly of claim 1 wherein the channel portion has no more than a first general width and the window portion has a second general width, greater than the first general width.

4. The airbag assembly of claim 3 wherein the projection includes a base spaced apart from the downwardly depending flange and an arm extending between an connecting the base and the downwardly depending flange, with the arm having a third general width which is roughly the same as the first general width.

5. The airbag assembly of claim 2 wherein the angled portion increases in width as it extends from window portion.

6. The airbag assembly of claim 4 wherein the window portion has a first shape and the base has the first shape and a fourth general width.

7. The airbag assembly of claim 6 wherein the fourth general width is smaller than the second general width and greater than the first general width.

8. The airbag assembly of claim 1 wherein at least one projection comprises a plurality of spaced apart projections.

9. The airbag apparatus of claim 8 wherein the at least one opening comprises a plurality of spaced apart openings disposed on the chute, wherein each of the projections extends through a respective one of the openings.

10. The airbag assembly of claim 1 wherein the projection cooperates with the opening to inhibit the distance and speed at which the door panel can linearly travel during deployment of the airbag.

11. The airbag assembly of claim 10 wherein the distance the panel is allowed to travel is sufficient to enable a portion of the downwardly depending flange to extend above the panel, the tear seam having a center seam, two opposed hinge seams, and side seams extending between and connecting the hinge seams and the center seam, the projection cooperating with the openings to enable the center seam to open before the hinge seams open.

12. The airbag assembly of claim 1 wherein the projection cooperates with the opening to maintain the door chute assembly and the door panel assembly in a relative fixed arrangement while the door chute assembly and the door panel are being connected to the panel.

13. A door chute and panel assembly for use with an airbag assembly comprising a panel having a tear seam forming at least one airbag door, and an air bag assembly comprising an inflatable airbag, the door chute and panel assembly comprising:
   a door chute assembly comprising a laterally extending flange connectable to the panel proximate the airbag door, the door chute assembly including a chute depending from the flange, the chute having an inner surface and an outer surface, the chute having at least one opening extending between and connecting the inner and outer surfaces of the chute, the opening comprising a window portion communicating with an angled channel portion; and
   a door panel assembly including at least one door panel disposed within the chute and connectable to the airbag door, the door panel having a downwardly depending flange having at least one projection extending laterally through the at least one opening of the chute.

14. The assembly of claim 13 wherein the channel portion has a width that decreases as the channel portion extends from the window portion, with the channel portion having a maximum width no greater than a first general width and the window portion having a second general width, greater than the first general width.

15. The assembly of claim 14 wherein the projection includes a base spaced apart from the downwardly depending flange and an arm extending between an connecting the base and the downwardly depending flange.

16. The assembly of claim 15 wherein at least one projection comprises a plurality of spaced apart projections.

17. The assembly of claim 16 wherein the at least one opening comprises a plurality of spaced apart openings disposed on the chute, wherein each of the projections extends through a respective one of the openings.

18. The assembly of claim 17 wherein the projection cooperates with the opening to inhibit the distance the door panel can linearly travel during deployment of the airbag.

19. The assembly of claim 18 wherein the distance the panel is allowed to travel is sufficient to enable a portion of the downwardly depending flange to extend above the panel.

20. A method for manufacturing an airbag assembly, the method comprising:
   providing a panel having a tear seam forming at least one airbag door;
   providing a door chute assembly comprising a chute having at least one opening comprising a window portion communicating with an angled channel portion, the chute assembly having a flange extending laterally from the chute;
   connecting the flange of the door chute assembly to the panel proximate the airbag door; and
   disposing a door panel assembly including at least one door panel disposing within the chute and connecting the door panel to the airbag door, the door panel having a downwardly depending flange having at least one projection extending laterally through the at least one opening of the chute, the tear seam having a center seam, two opposed hinge seams, and side seams extending between and connecting the hinge seams and the center seam, the projection cooperating with the opening to enable the center seam to open before the hinge seams open.

* * * * *